United States Patent
Bothwell et al.

(10) Patent No.: US 10,315,779 B2
(45) Date of Patent: Jun. 11, 2019

(54) SYSTEM AND METHOD FOR TAIL ROTOR MARGIN AWARENESS

(71) Applicant: Bell Helicopter Textron Inc., Fort Worth, TX (US)

(72) Inventors: Christopher M. Bothwell, Grapevine, TX (US); Robert Earl Worsham, II, Weatherford, TX (US); Sung Kyun Kim, Bedford, TX (US); Brandon Jeffrey Thomas, Crowley, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 0 days.

(21) Appl. No.: 15/708,767

(22) Filed: Sep. 19, 2017

(65) Prior Publication Data

US 2019/0084690 A1    Mar. 21, 2019

(51) Int. Cl.
| | |
|---|---|
| *B64D 45/00* | (2006.01) |
| *B64C 27/82* | (2006.01) |
| *B64D 43/00* | (2006.01) |
| B64C 13/04 | (2006.01) |
| B64C 13/50 | (2006.01) |

(52) U.S. Cl.
CPC .......... *B64D 45/0005* (2013.01); *B64C 27/82* (2013.01); *B64D 43/00* (2013.01); *B64C 13/0421* (2018.01); *B64C 13/503* (2013.01)

(58) Field of Classification Search
CPC ................................................ B64D 45/0005

USPC .......................................................... 340/946
See application file for complete search history.

(56) References Cited

U.S. PATENT DOCUMENTS

| | | | | |
|---|---|---|---|---|
| 3,065,799 | A | * | 11/1962 | McCarty, Jr. ........... B64C 27/16 244/123.1 |
| 4,109,886 | A | * | 8/1978 | Tribken ............... G05D 1/0061 244/17.13 |
| 4,599,698 | A | | 7/1986 | Fischer et al. |
| 5,607,122 | A | | 3/1997 | Hicks et al. |
| 6,371,408 | B1 | * | 4/2002 | Halwes ................... B64C 13/00 244/17.13 |
| 2011/0273315 | A1 | * | 11/2011 | Ishihara ............. B64D 45/0005 340/970 |
| 2017/0113792 | A1 | | 4/2017 | Vallart et al. |
| 2018/0093778 | A1 | * | 4/2018 | Spack ....................... F02C 9/20 |

* cited by examiner

*Primary Examiner* — Qutbuddin Ghulamali
(74) *Attorney, Agent, or Firm* — Slater Matsil, LLP

(57) ABSTRACT

In an embodiment, a rotorcraft includes: tail rotor blades; a tail rotor actuator coupled to the tail rotor blades such that the pitch of the tail rotor blades varies according to a current extension of the tail rotor actuator; pilot flight controls electrically coupled to the tail rotor actuator; and a flight control computer electrically coupled to the tail rotor actuator and the pilot flight controls, the flight control computer configured to: determine the current extension of the tail rotor actuator; determine whether the current extension of the tail rotor actuator is within a margin of a maximum extension of the tail rotor actuator; and indicate a first warning to a pilot in response to the current extension of the tail rotor actuator being within the margin of the maximum extension of the tail rotor actuator.

23 Claims, 8 Drawing Sheets

SYSTEM AND METHOD FOR TAIL ROTOR MARGIN AWARENESS

TECHNICAL FIELD

The present invention relates generally to a system and method for automated flight control in a rotorcraft, and, in particular embodiments, to a system and method for tail rotor margin awareness.

BACKGROUND

A rotorcraft may include one or more rotor systems including one or more main rotor systems. A main rotor system generates aerodynamic lift to support the weight of the rotorcraft in flight and thrust to move the rotorcraft in forward flight. Another example of a rotorcraft rotor system is a tail rotor system. A tail rotor system may generate thrust in the same direction as the main rotor system's rotation to counter the torque effect created by the main rotor system. For smooth and efficient flight in a rotorcraft, a pilot balances the engine power, main rotor collective thrust, main rotor cyclic thrust and the tail rotor thrust, and a control system may assist the pilot in stabilizing the rotorcraft and reducing pilot workload.

SUMMARY

In an embodiment, a rotorcraft includes: tail rotor blades; a tail rotor actuator coupled to the tail rotor blades such that the pitch of the tail rotor blades varies according to a current extension of the tail rotor actuator; pilot flight controls electrically coupled to the tail rotor actuator such that the current extension of the tail rotor actuator varies according to input from the pilot flight controls; and a flight control computer electrically coupled to the tail rotor actuator and the pilot flight controls, the flight control computer configured to: determine the current extension of the tail rotor actuator; determine whether the current extension of the tail rotor actuator is within a margin of a maximum extension of the tail rotor actuator; and indicate a first warning to a pilot in response to the current extension of the tail rotor actuator being within the margin of the maximum extension of the tail rotor actuator.

In some embodiments, the rotorcraft further includes: a sensor coupled to the tail rotor actuator, where the flight control computer is configured to determine the current extension of the tail rotor actuator by measuring the current extension of the tail rotor actuator with the sensor. In some embodiments, the rotorcraft further includes: an instrument panel, the flight control computer further configured to indicate the first warning with a visual cue at the instrument panel. In some embodiments, the visual cue is color coded based upon an extent of the current extension within the margin. In some embodiments, the rotorcraft further includes: an intercom, the flight control computer further configured to indicate the first warning with a first audio cue through the intercom. In some embodiments, the first audio cue is the same as a second audio cue used to indicate a second warning through the intercom. In some embodiments, the first audio cue is different from a second audio cue used to indicate a second warning through the intercom. In some embodiments, the pilot flight controls include a pedal electrically coupled to the tail rotor actuator. In some embodiments, the pedal includes a trim motor, the first warning indicated with haptic feedback through the trim motor. In some embodiments, the pilot flight controls include a beep switch electrically coupled to the tail rotor actuator. In some embodiments, the margin is 10% of the maximum extension of the tail rotor actuator. In some embodiments, the flight control computer is configured to determine whether the current extension of the tail rotor actuator is within the margin of the maximum extension of the tail rotor actuator by: calculating a difference between the maximum extension of the tail rotor actuator and the current extension of the tail rotor actuator; and determining whether the difference is less than the margin. In some embodiments, the flight control computer is configured to determine whether the current extension of the tail rotor actuator is within the margin of the maximum extension of the tail rotor actuator by: determining whether the current extension of the tail rotor actuator is greater than a predetermined value. In some embodiments, the flight control computer is further configured to vary the pitch of the tail rotor blades independent of the input from the pilot flight controls. In some embodiments, the rotorcraft further includes: aircraft sensors, the flight control computer further configured to vary the pitch of the tail rotor blades according to environmental conditions measured by the aircraft sensors. In some embodiments, the rotorcraft further includes: a rotor system to generate aerodynamic lift, the rotor system producing torque in a first direction; and an anti-torque system including the tail rotor blades and the tail rotor actuator, the anti-torque system producing torque in a second direction opposite the first direction.

In an embodiment, a method of flying a rotorcraft includes: sensing a current extension of a tail rotor actuator coupled to tail rotor blades of the rotorcraft; determining whether the current extension of the tail rotor actuator is within a margin of a maximum extension of the tail rotor actuator; and indicating a warning to a pilot of the rotorcraft in response to determining the current extension of the tail rotor actuator is within the margin of the maximum extension of the tail rotor actuator.

In some embodiments, the determining step is instituted in response to detecting a change in position of a pilot flight control of the rotorcraft. In some embodiments, the determining step is instituted in response to a control signal being generated by a flight control computer to change the current extension of the tail rotor actuator. In some embodiments, determining whether the current extension of the tail rotor actuator is within a margin of a maximum extension of the tail rotor actuator includes: calculating a difference between the maximum extension of the tail rotor actuator and the current extension of the tail rotor actuator; and determining whether the difference is less than the margin. In some embodiments, determining whether the current extension of the tail rotor actuator is within a margin of a maximum extension of the tail rotor actuator includes: determining whether the current extension of the tail rotor actuator is greater than a predetermined value. In some embodiments, the method further includes: sensing, by a flight control computer (FCC) of the rotorcraft, flight conditions of the rotorcraft; calculating, by the FCC, a desired extension of the tail rotor actuator to achieve or maintain a desired flight attitude; and transmitting independently of a pilot command a control signal to move the tail rotor actuator to the desired extension.

In an embodiment, a method of flying a rotorcraft includes: detecting input from a pilot flight control of the rotorcraft; sensing a current extension of a tail rotor actuator coupled to tail rotor blades of the rotorcraft; determining whether actuating the tail rotor actuator according to the input from the pilot flight control would cause an updated extension of the tail rotor actuator to be within a margin of a maximum extension of the tail rotor actuator; and indicating a warning to a pilot of the rotorcraft in response to determining the updated extension of the tail rotor actuator will be within the margin of the maximum extension of the tail rotor actuator.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
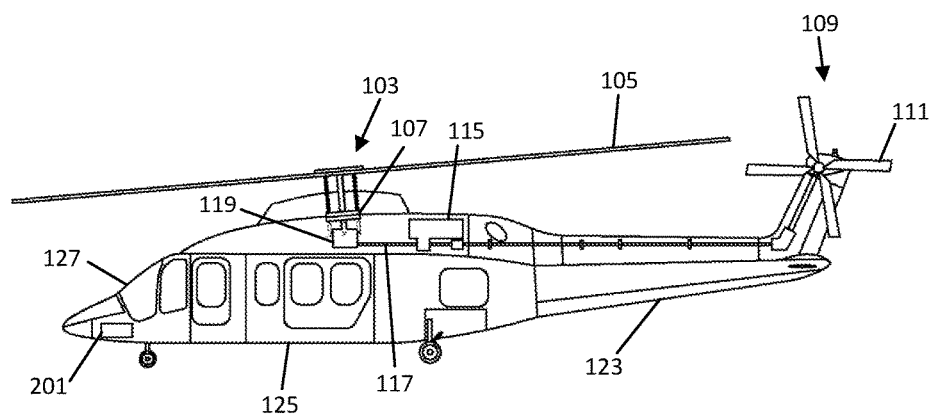
FIG. 1 illustrates a rotorcraft according to some embodiments.

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The increasing use of rotorcraft, in particular, for commercial and industrial applications, has led to the development of larger more complex rotorcraft. However, as rotorcraft become larger and more complex, the differences between flying rotorcraft and fixed wing aircraft has become more pronounced. Since rotorcraft use one or more main rotors to simultaneously provide lift, control attitude, control altitude, and provide lateral or positional movement, different flight parameters and controls are tightly coupled to each other, as the aerodynamic characteristics of the main rotors affect each control and movement axis. For example, the flight characteristics of a rotorcraft at cruising speed or high speed may be significantly different than the flight characteristics at hover or at relatively low speeds. Additionally, different flight control inputs for different axes on the main rotor, such as cyclic inputs or collective inputs, affect other flight controls or flight characteristics of the rotorcraft. For example, increasing forward speed will generally cause a change in power required by the main rotor to maintain level flight, and the collective inputs may be increased or decreased to maintain level flight. For the case of an increase in collective, power may be increased at the main rotor which, in turn, requires additional anti-torque force from the tail rotor. This is in contrast to fixed wing systems where the control inputs are less closely tied to each other and flight characteristics in different speed regimes are more closely related to each other.

Recently, fly-by-wire (FBW) systems have been introduced in rotorcraft to assist pilots in stably flying the rotorcraft and to reduce workload on the pilots. The FBW system may provide different control characteristics or responses for cyclic, pedal or collective control input in the different flight regimes, and may provide stability assistance or enhancement by decoupling physical flight characteristics so that a pilot is relieved from needing to compensate for some flight commands issued to the rotorcraft. FBW systems may be implemented in one or more flight control computers (FCCs) disposed between the pilot controls and flight control systems, providing corrections to flight controls that assist in operating the rotorcraft more efficiently or that put the rotorcraft into a stable flight mode while still allowing the pilot to override the FBW control inputs. The FBW systems in a rotorcraft may, for example, automatically adjust power output by the engine to match a collective control input, apply collective or power correction during a cyclic control input, provide automation of one or more flight control procedures, provide for default or suggested control positioning, or the like.

FBW systems for rotorcraft must provide stable flight characteristics for FBW controlled flight parameters while permitting the pilot to override or adjust any suggested flight parameters suggested by the FBW system. Additionally, in providing enhanced control and automated functionality for rotorcraft flight, the FBW system must maintain an intuitive and easy to use flight control system for the pilot. Thus, the FBW system adjusts the pilot flight controls so that the controls are in a position associated with the relevant flight parameter. For example, the FBW system may adjust the collective stick position to provide suggested or FBW controlled flight parameters, and which reflect a collective pitch angle or power setting. Thus, when the pilot releases the collective stick and the FBW system provides collective control commands, the collective stick is positioned intuitively in relation to the actual power or collective setting so that, when the pilot grasps the collective stick to retake control, the control stick is positioned where the pilot expects the stick to be positioned for the actual collective setting of the main rotor. Similarly, the FBW system use the cyclic stick to, for example, adjust for turbulence, drift or other disturbance to the flight path, and may move the cyclic stick as the FBW system compensates the cyclic control. Thus, when the pilot grasps the cyclic stick to take control of flight from the FBW system, the cyclic stick is positioned to reflect the actual cyclic settings or swashplate angle.

FIG. 1 illustrates a rotorcraft 101 according to some embodiments. The rotorcraft 101 has a main rotor system 103, which includes a plurality of main rotor blades 105. The pitch of each main rotor blade 105 may be controlled by a swashplate 107 in order to selectively control the attitude, altitude and movement of the rotorcraft 101. The swashplate 107 may be used to collectively and/or cyclically change the pitch of the main rotor blades 105. The rotorcraft 101 also has an anti-torque system, which may include a tail rotor 109, no-tail-rotor (NOTAR), or dual main rotor system. In rotorcraft with a tail rotor 109, the pitch of each tail rotor blade 111 is collectively changed in order to vary thrust of the anti-torque system, providing directional control of the rotorcraft 101. The pitch of the tail rotor blades 111 is changed by one or more tail rotor actuators. In some embodiments, the FBW system sends electrical signals to the tail rotor actuators or main rotor actuators to control flight of the rotorcraft.

Power is supplied to the main rotor system 103 and the anti-torque system by engines 115. There may be one or more engines 115, which may be controlled according to signals from the FBW system. The output of the engine 115 is provided to a driveshaft 117, which is mechanically and operatively coupled to the main rotor system 103 and the anti-torque system through a main rotor transmission 119 and a tail rotor transmission 121, respectively.

The rotorcraft 101 further includes a fuselage 125 and tail section 123. The tail section 123 may have other flight control devices such as horizontal or vertical stabilizers, rudder, elevators, or other control or stabilizing surfaces that are used to control or stabilize flight of the rotorcraft 101. The fuselage 125 includes a cockpit 127, which includes displays, controls, and instruments. It should be appreciated that even though rotorcraft 101 is depicted as having certain illustrated features, the rotorcraft 101 may have a variety of implementation-specific configurations. For instance, in some embodiments, cockpit 127 is configured to accommodate a pilot or a pilot and co-pilot, as illustrated. It is also contemplated, however, that rotorcraft 101 may be operated remotely, in which case the cockpit 127 could be configured as a fully functioning cockpit to accommodate a pilot (and possibly a co-pilot as well) to provide for greater flexibility of use, or could be configured with a cockpit having limited functionality (e.g., a cockpit with accommodations for only one person who would function as the pilot operating perhaps with a remote co-pilot or who would function as a co-pilot or back-up pilot with the primary piloting functions being performed remotely). In yet other contemplated embodiments, rotorcraft 101 could be configured as an unmanned vehicle, in which case the cockpit 127 could be eliminated entirely in order to save space and cost.

Figure 2:
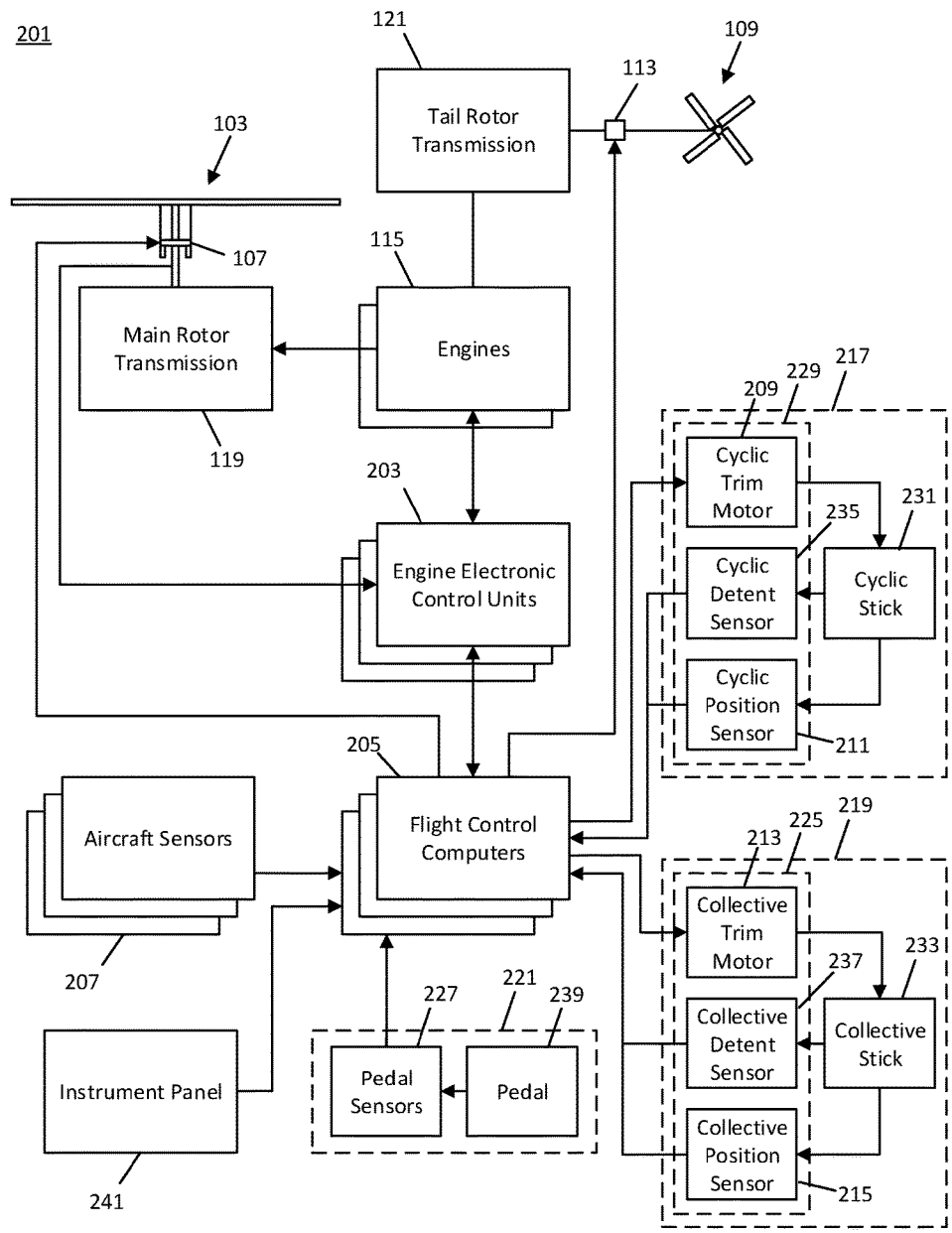
FIG. 2 illustrates a fly-by-wire flight control system for a rotorcraft according to some embodiments.

FIG. 2 illustrates a fly-by-wire flight control system 201 for a rotorcraft according to some embodiments. A pilot may manipulate one or more pilot flight controls in order to control flight of the rotorcraft. The pilot flight controls may include manual controls such as a cyclic stick 231 in a cyclic control assembly 217, a collective stick 233 in a collective control assembly 219, and pedals 239 in a pedal control assembly 221. Inputs provided by the pilot to the pilot flight controls may be transmitted mechanically and/or electronically (e.g., via the FBW flight control system) to flight control devices by the flight control system 201. Flight control devices may represent devices operable to change the flight characteristics of the rotorcraft. Flight control devices on the rotorcraft may include mechanical and/or electrical systems operable to change the positions or angle of attack of the main rotor blades 105 and the tail rotor blades in or to change the power output of the engines 115, as examples. Flight control devices include systems such as the swashplate 107, tail rotor actuator 113, and systems operable to control the engines 115. The flight control system 201 may adjust the flight control devices independently of the flight crew in order to stabilize the rotorcraft, reduce workload of the flight crew, and the like. The flight control system 201 includes engine electronic control units (EECUs) 203, flight control computers (FCCs) 205, and aircraft sensors 207, which collectively adjust the flight control devices.

The flight control system 201 has one or more FCCs 205. In some embodiments, multiple FCCs 205 are provided for redundancy. The FCCs 205 may include, e.g., a processor adapted to perform computations and/or other processing related tasks, and memory (such as a non-transitory computer readable medium) adapted to store programming and/or instructions for execution by the processor. One or more modules within the FCCs 205 may be partially or wholly embodied as software and/or hardware for performing any functionality described herein. In embodiments where the flight control system 201 is a FBW flight control system, the FCCs 205 may analyze pilot inputs and dispatch corresponding commands to the EECUs 203, the tail rotor actuator 113, and/or actuators for the swashplate 107. Further, the FCCs 205 are configured and receive input commands from the pilot controls through sensors associated with each of the pilot flight controls. The input commands are received by measuring the positions of the pilot controls. The FCCs 205 also control tactile cueing commands to the pilot controls or display information in instruments on, for example, an instrument panel 241.

The EECUs 203 control the engines 115. For example, the EECUs 203 may vary the output power of the engines 115 to control the rotational speed of the main rotor blades or the tail rotor blades. The EECUs 203 may control the output power of the engines 115 according to commands from the FCCs 205, or may do so based on feedback such as measured revolutions per minute (RPM) of the main rotor blades.

The aircraft sensors 207 are in communication with the FCCs 205. The aircraft sensors 207 may include sensors for measuring a variety of rotorcraft systems, flight parameters, environmental conditions and the like. For example, the aircraft sensors 207 may include sensors for measuring airspeed, altitude, attitude, acceleration, position, magnetic orientation, temperature, airspeed, vertical speed, and the like. Other aircraft sensors 207 could include sensors relying upon data or signals originating external to the rotorcraft, such as a global positioning system (GPS) sensor, a VHF Omnidirectional Range sensor, Instrument Landing System (ILS), and the like.

The cyclic control assembly 217 is connected to a cyclic trim assembly 229 having one or more cyclic position sensors 211, one or more cyclic detent sensors 235, and one or more cyclic actuators or cyclic trim motors 209. The cyclic position sensors 211 measure the position of the cyclic stick 231. In some embodiments, the cyclic stick 231 is a single control stick that moves along two axes and permits a pilot to control pitch, which is the vertical angle of the nose of the rotorcraft and roll, which is the side-to-side angle of the rotorcraft. In some embodiments, the cyclic control assembly 217 has separate cyclic position sensors 211 that measuring roll and pitch stick positions separately. The cyclic position sensors 211 for detecting roll and pitch generate roll and pitch signals, respectively, (sometimes referred to as cyclic longitude and cyclic latitude signals, respectively) which are sent to the FCCs 205, which controls the swashplate 107, engines 115, tail rotor 109 or related flight control devices.

The cyclic trim motors 209 are connected to the FCCs 205, and receive signals from the FCCs 205 to move the cyclic stick 231. In some embodiments, the FCCs 205 determine a suggested cyclic stick position for the cyclic stick 231 according to one or more of the collective stick position, the pedal position, the speed, acceleration, altitude and attitude of the rotorcraft, the engine revolutions per minute (RPM), engine temperature, main rotor RPM, engine torque or other rotorcraft system conditions or flight conditions. The suggested cyclic stick position is a position determined by the FCCs 205 to give a desired cyclic action. In some embodiments, the FCCs 205 send a suggested cyclic stick position signal indicating the suggested cyclic stick position to the cyclic trim motors 209. While the FCCs 205 may command the cyclic trim motors 209 to move the cyclic stick 231 to a particular position to be indicative of the associated position of the swashplate 107, the cyclic position sensors 211 detect the actual position of the cyclic stick 231 that is set by the cyclic trim motors 209 or input by the pilot, allowing the pilot to override the suggested cyclic stick position. The cyclic trim motor 209 is connected to the cyclic stick 231 so that the pilot may move the cyclic stick 231 while the trim motor is driving the cyclic stick 231 to override the suggested cyclic stick position. Thus, in some embodiments, the FCCs 205 receive a signal from the cyclic position sensors 211 indicating the actual cyclic stick position, and do not rely on the suggested cyclic stick position to command the swashplate 107.

Similar to the cyclic control assembly 217, the collective control assembly 219 is connected to a collective trim assembly 225 having one or more collective position sensors 215, one or more collective detent sensors 237, and one or more collective actuators or collective trim motors 213. The collective position sensors 215 measure the position of a collective stick 233 in the collective control assembly 219. In some embodiments, the collective stick 233 is a single control stick that moves along a single axis or with a lever type action. A collective position sensor 215 detects the position of the collective stick 233 and sends a collective position signal to the FCCs 205, which controls engines 115, swashplate actuators, or related flight control devices according to the collective position signal to control the vertical movement of the rotorcraft. In some embodiments, the FCCs 205 may send a power command signal to the EECUs 203 and a collective command signal to the main rotor or swashplate actuators so that the collective pitch angle of the main rotor blades is raised or lowered collectively, and the engine power is set to provide the needed power to keep the main rotor RPM substantially constant.

The collective trim motor 213 is connected to the FCCs 205, and receives signals from the FCCs 205 to move the collective stick 233. Similar to the determination of the suggested cyclic stick position, in some embodiments, the FCCs 205 determine a suggested collective stick position for the collective stick 233 according to one or more of the cyclic stick position, the pedal position, the speed, acceleration, altitude and attitude of the rotorcraft, the engine RPM, engine temperature, main rotor RPM, engine torque or other rotorcraft system conditions or flight conditions. The FCCs 205 generate the suggested collective stick position and send a corresponding suggested collective stick signal to the collective trim motors 213 to move the collective stick 233 to a particular position. The collective position sensors 215 detect the actual position of the collective stick 233 that is set by the collective trim motor 213 or input by the pilot, allowing the pilot to override the suggested collective stick position.

The pedal control assembly 221 has one or more pedal sensors 227 that measure the position of pedals or other input elements in the pedal control assembly 221. In some embodiments, the pedal control assembly 221 is free of a trim motor or actuator, and may have a mechanical return element that centers the pedals when the pilot releases the pedals. In other embodiments, the pedal control assembly 221 has one or more trim motors that drive the pedal to a suggested pedal position according to a signal from the FCCs 205. The pedal sensor 227 detects the position of the pedals 239 and sends a pedal position signal to the FCCs 205, which controls the tail rotor 109 to cause the rotorcraft to yaw or rotate around a vertical axis.

The trim motors 209 and 213 may drive the cyclic stick 231 and collective stick 233, respectively, to suggested (or matching swashplate) positions. The trim motors 209 and 213 may drive the cyclic stick 231 and collective stick 233, respectively, to suggested positions, but this movement capability may also be used to provide tactile cueing to a pilot. The trim motors 209 and 213 may push the respective stick in a particular direction when the pilot is moving the stick to indicate a particular condition. Since the FBW system mechanically disconnects the stick from one or more flight control devices, a pilot may not feel a hard stop, vibration, or other tactile cue that would be inherent in a stick that is mechanically connected to a flight control assembly. In some embodiments, the FCCs 205 may cause the trim motors 209 and 213 to push against a pilot command so that the pilot feels a resistive force, or may command one or more friction devices to provide friction that is felt when the pilot moves the stick. Thus, the FCCs 205 control the feel of a stick by providing pressure and/or friction on the stick.

Additionally, the cyclic control assembly 217, collective control assembly 219 and/or pedal control assembly 221 may each have one or more detent sensors that determine whether the pilot is handling a particular control device. For example, the cyclic control assembly 217 may have a cyclic detent sensor 235 that determines that the pilot is moving the cyclic stick 231, while the collective control assembly 219 has a collective detent sensor 237 that determines whether the pilot is moving the collective stick 233. These detent sensors 235, 237 detect pilot commanded motion of the respective control stick that is caused by pilot input, as opposed to motion and/or position caused by commands from the FCCs 205, rotorcraft vibration, and the like and provide feedback signals indicative of such to the FCCs 205. When the FCCs 205 detect that a pilot has control of, or is manipulating, a particular control, the FCCs 205 may determine that stick to be out-of-detent (OOD). Likewise, the FCCs may determine that the stick is in-detent (ID) when the signals from the detent sensors indicate to the FCCs 205 that the pilot has released a particular stick. The FCCs 205 may provide different default control or automated commands to one or more flight systems based on the detent status of a particular stick or pilot control.

Figure 3:
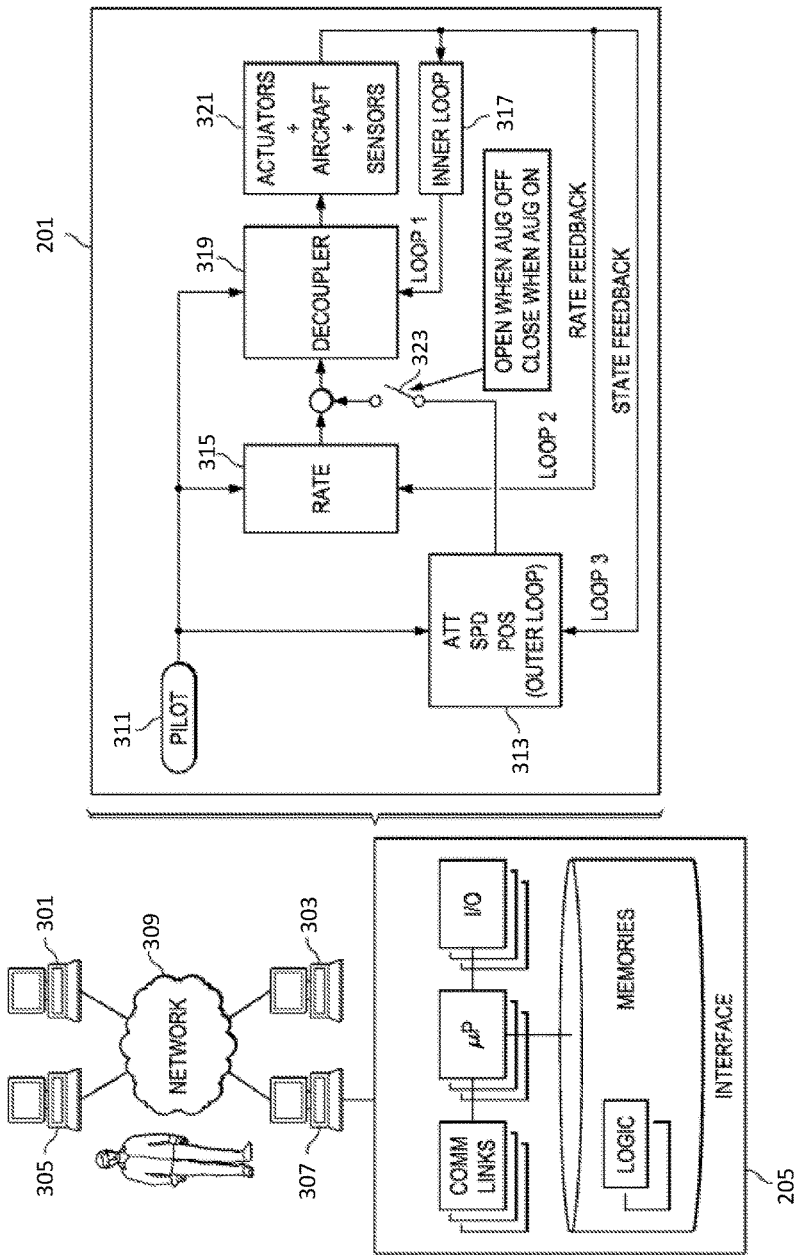
FIG. 3 representatively illustrates a three-loop flight control system according to some embodiments.

Moving now to the operational aspects of flight control system 201, FIG. 3 illustrates in a highly schematic fashion, a manner in which flight control system 201 may implement FBW functions as a series of inter-related feedback loops running certain control laws. FIG. 3 representatively illustrates a three-loop flight control system 201 according to an embodiment. In some embodiments, elements of the three-loop flight control system 201 may be implemented at least partially by FCCs 205. As shown in FIG. 3, however, all, some, or none of the components (301, 303, 305, 307) of three-loop flight control system 201 could be located external or remote from the rotorcraft 101 and communicate to on-board devices through a network connection 309.

The three-loop flight control system 201 of FIG. 3 has a pilot input 311, an outer loop 313, a rate (middle) loop 315, an inner loop 317, a decoupler 319, and aircraft equipment 321 (corresponding, e.g., to flight control devices such as swashplate 107, tail rotor transmission 121, etc., to actuators (not shown) driving the flight control devices, to sensors such as aircraft sensors 207, position sensors 211, 215, detent sensors 235, 237, etc., and the like).

In the example of FIG. 3, a three-loop design separates the inner stabilization and rate feedback loops from outer guidance and tracking loops. The control law structure primarily assigns the overall stabilization task and related tasks of reducing pilot workload to inner loop 317. Next, middle loop 315 provides rate augmentation. Outer loop 313 focuses on guidance and tracking tasks. Since inner loop 317 and rate loop 315 provide most of the stabilization, less control effort is required at the outer loop level. As representatively illustrated in FIG. 3, a switch 323 may be provided to turn outer loop flight augmentation on and off, the tasks of outer loop 313 are not necessary for flight stabilization.

In some embodiments, the inner loop 317 and rate loop 315 include a set of gains and filters applied to roll/pitch/yaw 3-axis rate gyro and acceleration feedback sensors. Both the inner loop and rate loop may stay active, independent of various outer loop hold modes. Outer loop 313 may include cascaded layers of loops, including an attitude loop, a speed loop, a position loop, a vertical speed loop, an altitude loop, and a heading loop. In accordance with some embodiments, the control laws running in the illustrated the loops allow for decoupling of otherwise coupled flight characteristics, which in turn may provide for more stable flight characteristics and reduced pilot workload. Furthermore, the outer loop 313 may allow for automated or semi-automated operation of certain high-level tasks or flight patterns, thus further relieving the pilot workload and allowing the pilot to focus on other matters including observation of the surrounding terrain.

Figure 4:
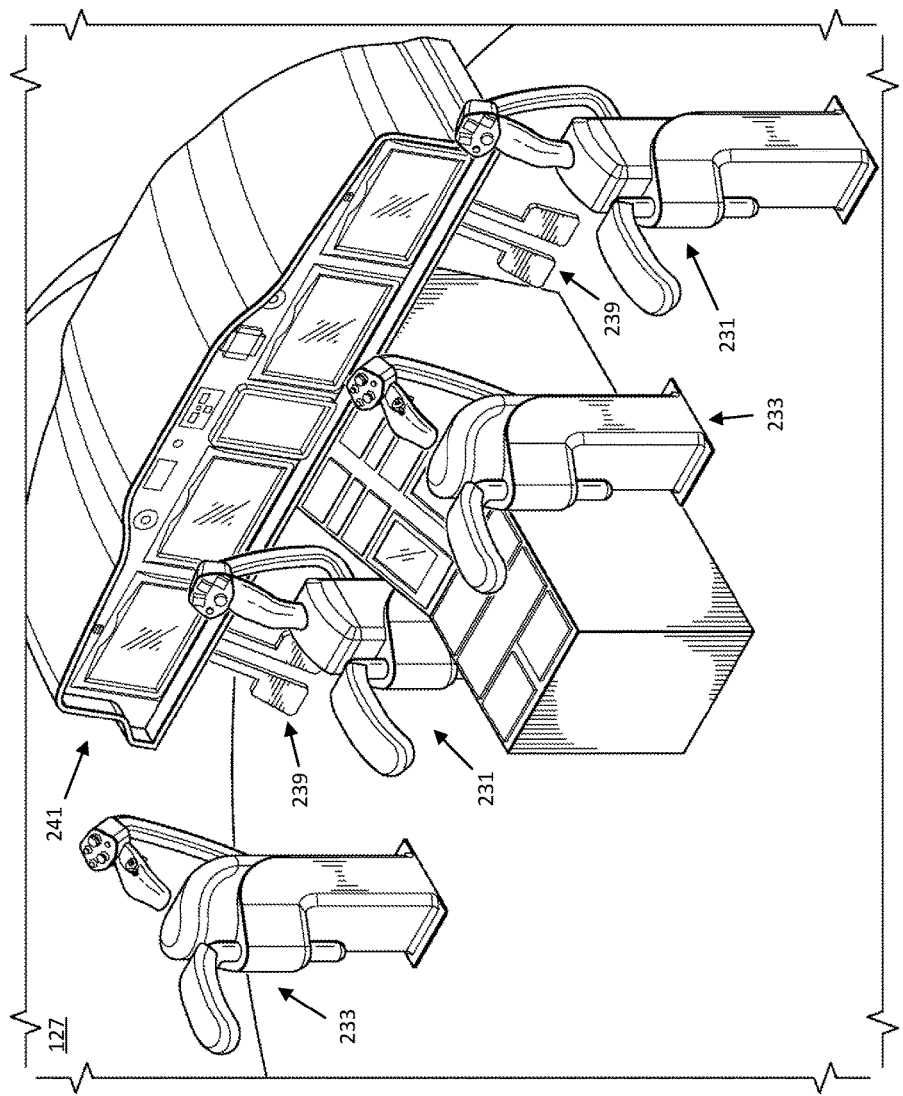
FIG. 4 illustrates the inside of a cockpit.

FIG. 4 illustrates the inside of the cockpit 127. In the example cockpit shown in FIG. 4, a set of pilot flight controls is provided for a pilot and a co-pilot (both of which may be referred to as a pilot herein).

The fly-by-wire flight control system 201 may be configured so that the rotorcraft 101 provides a flight experience for the pilot that is similar to the flight experience of a mechanical rotorcraft. In other words, although a fly-by-wire system may be controlled with any type of input devices, embodiment fly-by-wire systems mimic the behavior of a mechanical rotorcraft from the perspective of the pilot. For example, in a rotorcraft with a mechanical flight control system, the pilot naturally receives feedback through the pilot flight controls because the pilot flight controls are mechanically connected to the flight control devices and resist movement when the pilot operates the pilot flight controls. Because the pilot flight controls in a fly-by-wire system are not mechanically connected to the flight control devices, they do not provide similar feedback to the pilot on their own. In order to mimic the behavior of a mechanical flight control system, the fly-by-wire flight control system 201 may provide cues to the pilot when the flight control devices are adjusted. In some embodiments, the cues are provided as haptic feedback through the pilot flight controls. For example, if the fly-by-wire flight control system 201 adjusts the collective pitch of the main rotor blades 105, haptic feedback may be provided to the collective stick 233 through the collective trim motors 213. Haptic feedback allows the pilot to know when an actuator in the rotorcraft 101 is at or near the limit of the actuator. Continuing the above example, providing haptic feedback through a trim motor in the collective control assembly 219 allows the pilot to know when the swashplate 107 is at or near its limit. The pilot may make flight-time decisions based on whether an actuator may be adjusted or is at its limit. Providing cues to the pilot when the flight control devices are adjusted may mimic the feedback that mechanical flight controls would provide. As such, the user experience for the pilot may be consistent across both the fly-by-wire system of the rotorcraft 101, and the mechanical systems of other rotorcraft. A consistent user experience for pilots across different types of rotorcraft may allow the pilot to respond to an emergency situation without the hindrance of adapting to the different user experiences of different types of rotorcraft.

Providing trim motors in all of the pilot flight controls may be costly or complex to manufacture, may add weight to the rotorcraft 101, and may be costly or complex to maintain or repair. As such, in some embodiments, haptic feedback is provided for some but not all of the pilot flight controls. In an embodiment, haptic feedback is provided for the cyclic control assembly 217 and the collective control assembly 219 when the swashplate 107 is actuated, but is not provided for the pedal control assembly 221 when the tail rotor actuator 113 is actuated. Because haptic feedback may not be provided for the pedal control assembly 221, other types of cues may be used to alert the pilot when the tail rotor actuator 113 is at or near the limit of the actuator. In some embodiments, a visual and/or audio cue is provided to the pilot. For example, a visual cue may be displayed on the instrument panel 241, and/or an audio cue may be played through the intercom. In some embodiments, the actuator limit is evaluated and the visual and/or audio cue is provided in response to the pilot attempting to operate the actuator.

The tail rotor actuator 113 may be actuated under several circumstances. Heavy winds, gusts of wind, or pilot commands may cause the direction or bearing of the rotorcraft 101 to drift. The fly-by-wire flight control system 201 may correct heading by adjusting the tail rotor actuator 113 to increase or decrease the thrust produced by the tail rotor 109. In an embodiment, such as when the aircraft is in hover or at trimmed level flight, the tail rotor actuator 113 is controlled by the outer loop 313 so that the yaw rate of the rotorcraft 101 is zero when the pilot pedal is out of detent, e.g., so that the rotorcraft 101 does not change bearing. This adjustment may be made without input of the pilot, in order to maintain the direction or bearing of the rotorcraft 101. The tail rotor actuator 113 may also be actuated when the pilot maneuvers the rotorcraft 101. For example, when turning into heavy winds, the tail rotor actuator 113 may be adjusted by the inner loop 317 and/or the rate loop 315 to maintain stability. Actuation of the tail rotor actuator 113 may occur as a result of the decoupled flight characteristics. In embodiments where haptic feedback is not provided for the pedal control assembly 221, the position of the pedals 239 is not driven or changed when the FCCs 205 adjust the tail rotor actuator 113 (in contrast to other controls such as the collective stick 233 or the cyclic stick 231). As a result, the position of the pedals 239 does not necessarily reflect the actual position of the tail rotor actuator 113. Cues may be provided to warn the pilot of this discrepancy.

The tail rotor actuator 113 has a maximum amount of throw. The maximum throw may vary depending on the capabilities of the tail rotor actuator 113. For example, the tail rotor actuator 113 may be designed to have more throw in rotorcraft with greater weight-bearing capabilities. The flight control system 201 has partial or full authority of the tail rotor actuator 113 because it is a fly-by-wire system. In an embodiment, the inner loop 317, rate loop 315, and/or outer loop 313 of the fly-by-wire flight control system 201 may only exercise a portion of the authority over the tail rotor actuator 113. The remaining authority is reserved for the pilot so that some actuation occurs when the pilot operates the pedal control assembly 221, even when the fly-by-wire flight control system 201 is operating near the maximum throw. For example, the tail rotor actuator 113 may have a first amount of throw in each direction, and the inner control loops may exercise up to 90% of the first amount of throw, leaving a tail rotor margin of 10% of the first amount of throw for the pilot. In some embodiments, the authority exercised over the tail rotor actuator 113 is asymmetric. For example, the tail rotor actuator 113 may have a first amount of throw in a first direction, and a second amount of throw in a second direction, where the first amount of throw is different (e.g., greater or less) than the second amount of throw.

A tail rotor margin warning is provided to the pilot when the tail rotor actuator 113 is within the margin of the maximum throw. The warning may prompt the pilot to change course or stop a maneuver in order to avoid maxing out the tail rotor actuator 113. The warning may be indicated to the pilot in several manners. In some embodiments, the warning is a visual cue indicated on the instrument panel 241. In embodiments where the warning is a visual cue, it may be color coded based upon an extent of the current extension within the margin. In some embodiments, the warning is an audio cue indicated over the intercom. The audio cue may be a generic audio cue, or an audio cue specific to the tail rotor margin warning. In some embodiments, the warning is a haptic cue indicated through one or more of the flight controls, such as the pedal control assembly 221. It should be appreciated that the warning may be indicated in a wide variety of manners not used in a mechanical flight control system. The warning may also be a combination of several cues. For example, a visual cure may be presented while a tone is played over the intercom. In some embodiments, the actuator limit is evaluated and the warning is provided on a continual basis. For example, the warning is provided by illuminating a warning light on the instrument panel 241 whenever the actuator is at or near the limit. The warning light may stay illuminated even when the pedal control assembly 221 has not been recently used by the pilot. In some embodiments, the actuator limit is evaluated and the warning is provided in response to receiving input commands from the pilot flight controls. For example, the warning may be provided when the FCCs 205 detect a change in the position of the pedals 239 with the pedal sensors 227. In some embodiments, the actuator limit is evaluated and the warning is provided when a control signal is provided to change the position of the tail rotor actuator 113.

Although some embodiments are discussed in the context of providing the tail rotor margin warning in response to a change in position of the pedals 239, it should be appreciated that the warning could be provided in response to changes in any pilot flight controls that actuate the tail rotor actuator 113. For example, because actuation of the tail rotor actuator 113 may occur as a result of decoupled flight characteristics, other controls such as the cyclic stick 231 or collective stick 233 may result in actuation of the tail rotor actuator 113. Further, a button or switch may also cause actuation of the tail rotor actuator 113. For example, a beep switch disposed on the collective stick 233 may cause actuation of the tail rotor actuator 113 when it is manipulated. Like the pedals 239, the beep switch may not have a mechanism for providing mechanical feedback to the pilot. Instead, the tail rotor margin warning may be provided to the pilot as a visual cue, an audio cue, or the like.

FIGS. 5A through 6B illustrate various tail rotor actuator monitoring methods. The methods shown in FIGS. 5A and 5B may be used to warn the pilot that the tail rotor actuator 113 is at or near its limit. The methods shown in FIGS. 6A and 6B may be used to preemptively warn the pilot that a command will cause the tail rotor actuator 113 to be is at or near its limit. The methods shown in FIGS. 6A and 6B may be performed as part of a control or feedback loop; as such, it should be appreciated that the steps of the methods shown in FIGS. 6A and 6B may be repeated periodically or continuously.

Figure 5A:
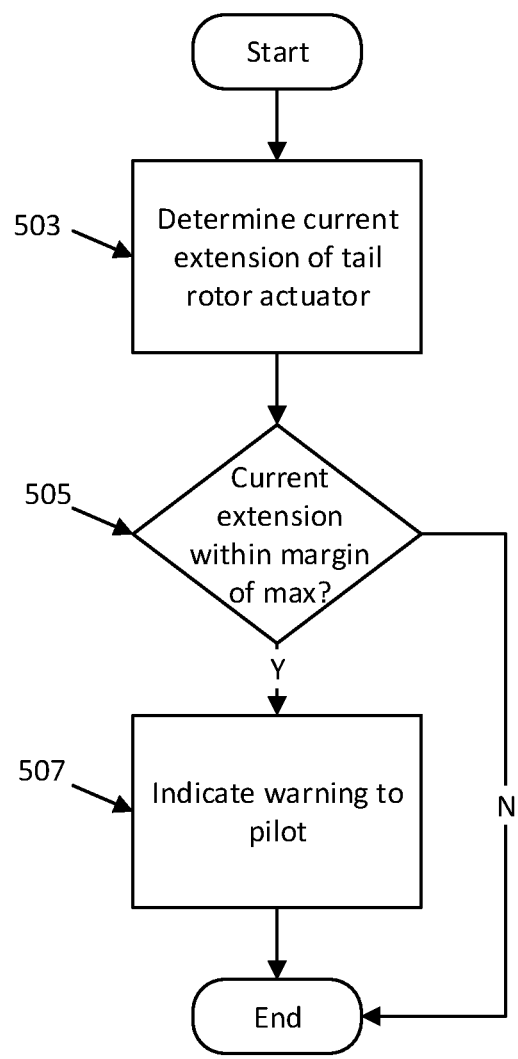
FIGS. 5A, 5B, 6A, and 6B illustrate various tail rotor actuator monitoring methods.

FIG. 5A illustrates a tail rotor actuator monitoring method 501. The tail rotor actuator monitoring method 501 may be used to warn the pilot when the tail rotor actuator 113 is at or near its limit. The tail rotor actuator monitoring method 501 may be performed in embodiments where the warning is provided on a continual basis.

The current extension of the tail rotor actuator 113 is determined (step 503). The current extension of the tail rotor actuator 113 is the absolute value of the distance that the tail rotor actuator 113 is presently thrown in either direction. In some embodiments, the extension of the tail rotor actuator 113 is determined by measuring it with a sensor (not shown) in the tail rotor 109. The sensor may be electrically coupled to the FCCs 205, which perform the measurement by receiving and evaluating a signal from the sensor. In some embodiments, the extension of the tail rotor actuator 113 is determined by observing a commanded position of the tail rotor actuator 113 set by the FCCs 205. Such a determination may be made, for example, in the outer loop 313, and/or the middle loop 315.

If the current extension of the tail rotor actuator 113 is near or within a margin of a predefined position of the actuator (step 505), a warning is indicated to the pilot (step 507). In an embodiment, the predefined position is a maximum extension of the actuator, although it should be appreciated that the predefined position may be any extension amount of the actuator. Determining whether the current extension is within the margin of the maximum extension may be performed in several ways. In some embodiments, a difference between the maximum and current extensions is computed, and the difference is compared to the margin. If the difference is less than the margin, then the current extension is within the margin of the maximum extension. For example, if the margin is 10%, then a difference of less than 10% of the maximum extension indicates the current extension is within the margin. In some embodiments, a predetermined value corresponding to the margin may be determined and stored. For example, if the margin is 10%, then the predetermined value is 10% less than the maximum, or 90% of the maximum. If the current extension is greater than the predetermined value, then the current extension is within the margin of the maximum extension.

Figure 5B:
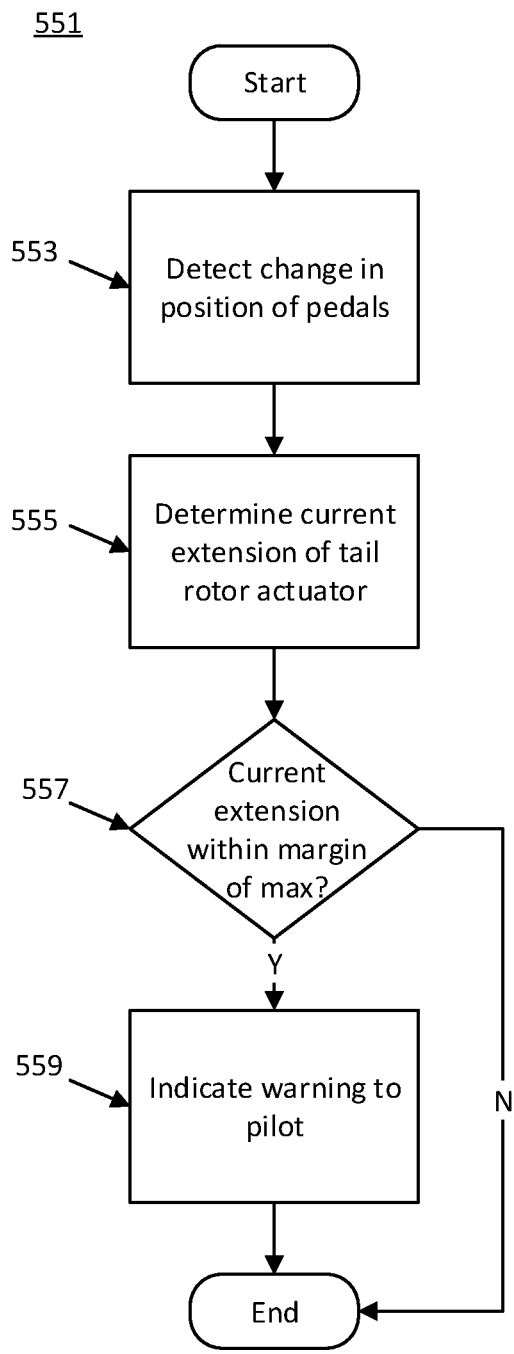

FIG. 5B illustrates a tail rotor actuator monitoring method 551. The tail rotor actuator monitoring method 551 may be used to warn the pilot when the tail rotor actuator 113 is at or near its limit. The tail rotor actuator monitoring method 551 may be performed in embodiments where the warning is provided in response to receiving input commands from the pilot flight controls.

A change in position of the pedals 239 is detected (step 553). The change may be detected by the FCCs 205, in response to receiving a pedal position signal from the pedal sensor 227. In response to detecting the change in pedal position, the current extension of the tail rotor actuator 113 is determined (step 555). As a result, the pilot may be warned only when needed. If the current extension of the tail rotor actuator 113 is within a margin of a maximum extension of the actuator (step 557), a warning is indicated to the pilot (step 559). Steps 555-559 are similar to steps 503-507 above, and details will not be repeated herein.

Figure 6A:
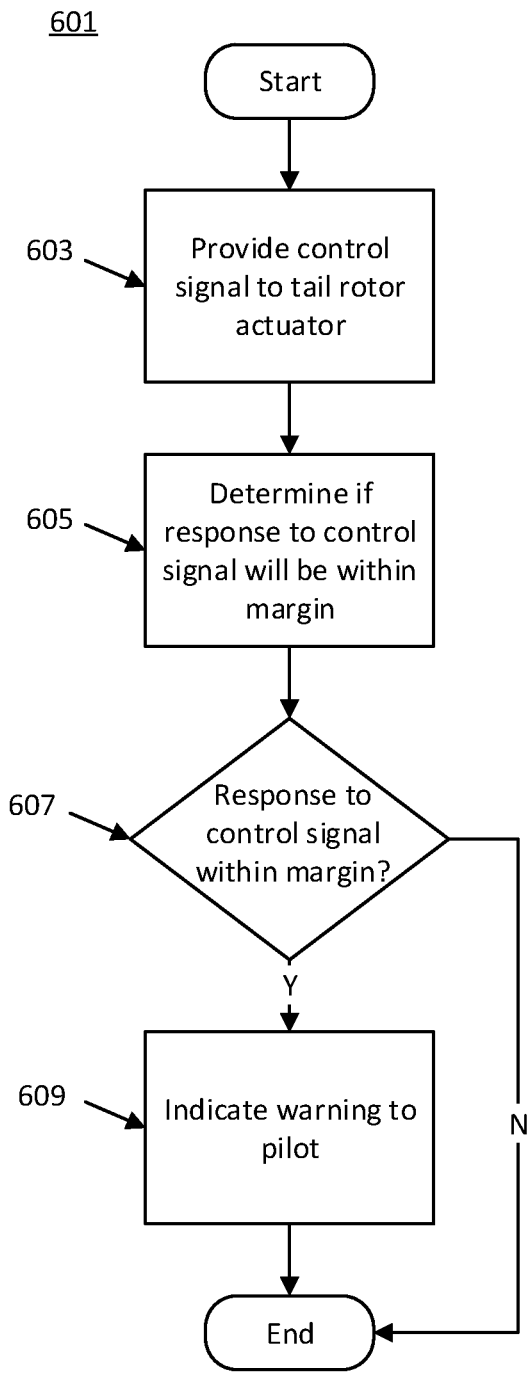

FIG. 6A illustrates a tail rotor actuator monitoring method 601. The tail rotor actuator monitoring method 601 may be used to preemptively warn the pilot when the tail rotor actuator 113 is at or near its limit. The tail rotor actuator monitoring method 601 may be performed in embodiments where the warning is provided when a control signal is provided to change the position of the tail rotor actuator 113.

A control signal for the tail rotor actuator 113 is provided (step 603). The control signal may be provided by the FCCs 205. For example, the FCCs 205 may calculate the control signal and supply it to the tail rotor actuator 113 as part of the control logic of the inner loop 317, which may be performed in response to input from the pilot flight controls. In response to providing the control signal, the FCCs 205 determine whether the response of the tail rotor actuator 113 to the control signal will be within the margin of the maximum extension (step 605). In other words, the FCCs 205 determine whether actuating the tail rotor actuator 113 according to the input from the pilot flight control would cause an updated extension of the tail rotor actuator to be within the margin of the maximum extension. As a result, the pilot may be preemptively warned if the extension of the tail rotor actuator 113 will exceed the margin. If the response to the control signal for the tail rotor actuator 113 will cause the extension of the actuator to be within the margin of a maximum extension of the actuator (step 607), a warning is indicated to the pilot (step 609).

Figure 6B:
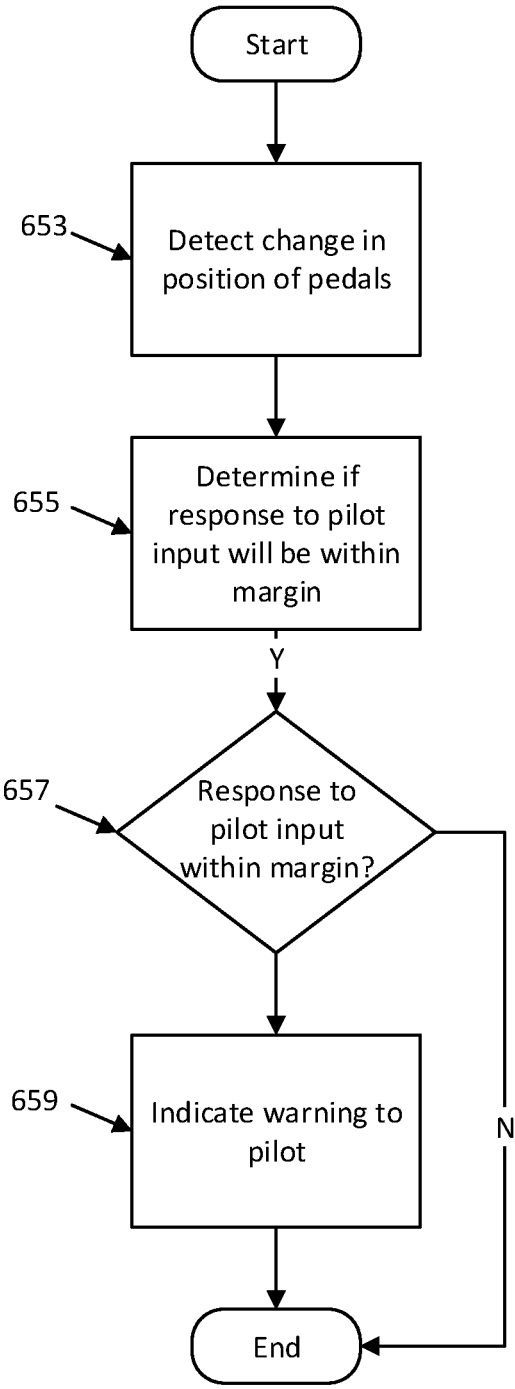

FIG. 6B illustrates a tail rotor actuator monitoring method 651. The tail rotor actuator monitoring method 651 may be used to preemptively warn the pilot when the tail rotor actuator 113 is at or near its limit. The tail rotor actuator monitoring method 651 may be performed in embodiments where the warning is preemptively provided in response to receiving input commands from the pilot flight controls.

A change in position of the pedals 239 is detected (step 653). The change may be detected by the FCCs 205, in response to receiving a pedal position signal from the pedal sensor 227. In response to detecting the change in pedal position, the FCCs 205 determine whether the response of the tail rotor actuator 113 to the change in pedal position will be within the margin of the maximum extension (step 655). As a result, the pilot may be preemptively warned only when needed. If the response to the change in pedal position will cause the extension of the tail rotor actuator 113 to be within the margin of a maximum extension of the actuator (step 657), a warning is indicated to the pilot (step 659).

Embodiments may achieve advantages. Warning the pilot that the current extension of the tail rotor actuator exceeds the margin may allow the pilot to know that the position of the pedals does not necessarily reflect the actual position of the tail rotor actuator. The pilot may adjust flight accordingly. Providing the warning with a visual or audio cue may reduce costs of manufacturing the rotorcraft.

Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A rotorcraft comprising:
   tail rotor blades;
   a tail rotor actuator coupled to the tail rotor blades such that the pitch of the tail rotor blades varies according to a current extension of the tail rotor actuator;
   pilot flight controls electrically coupled to the tail rotor actuator such that the current extension of the tail rotor actuator varies according to input from the pilot flight controls; and
   a flight control computer electrically coupled to the tail rotor actuator and the pilot flight controls, the flight control computer configured to:
      determine the current extension of the tail rotor actuator;
      determine whether the current extension of the tail rotor actuator is within a margin of an extension limit of the tail rotor actuator; and
      indicate a first warning to a pilot in response to the current extension of the tail rotor actuator being within the margin of the extension limit of the tail rotor actuator.

2. The rotorcraft of claim 1, further comprising:
   a sensor coupled to the tail rotor actuator, wherein the flight control computer is configured to determine the current extension of the tail rotor actuator by measuring the current extension of the tail rotor actuator with the sensor.

3. The rotorcraft of claim 1, further comprising:
   an instrument panel, the flight control computer further configured to indicate the first warning with a visual cue at the instrument panel.

4. The rotorcraft of claim 3, wherein the visual cue is color coded based upon an extent of the current extension within the margin.

5. The rotorcraft of claim 1, further comprising:
   an intercom, the flight control computer further configured to indicate the first warning with a first audio cue through the intercom.

6. The rotorcraft of claim 5, wherein the first audio cue is the same as a second audio cue used to indicate a second warning through the intercom.

7. The rotorcraft of claim 5, wherein the first audio cue is different from a second audio cue used to indicate a second warning through the intercom.

8. The rotorcraft of claim 1, wherein the pilot flight controls include a pedal electrically coupled to the tail rotor actuator.

9. The rotorcraft of claim 8, wherein the pedal comprises a trim motor, the first warning indicated with haptic feedback through the trim motor.

10. The rotorcraft of claim 1, wherein the pilot flight controls include a beep switch electrically coupled to the tail rotor actuator.

11. The rotorcraft of claim 1, wherein the margin is 10% of the extension limit of the tail rotor actuator.

12. The rotorcraft of claim 1, wherein the flight control computer is configured to determine whether the current extension of the tail rotor actuator is within the margin of the extension limit of the tail rotor actuator by:
   calculating a difference between the extension limit of the tail rotor actuator and the current extension of the tail rotor actuator; and
   determining whether the difference is less than the margin.

13. The rotorcraft of claim 1, wherein the flight control computer is configured to determine whether the current extension of the tail rotor actuator is within the margin of the extension limit of the tail rotor actuator by:
determining whether the current extension of the tail rotor actuator is greater than a predetermined value.

14. The rotorcraft of claim 1, wherein the flight control computer is further configured to vary the pitch of the tail rotor blades independent of the input from the pilot flight controls.

15. The rotorcraft of claim 14, further comprising:
aircraft sensors, the flight control computer further configured to vary the pitch of the tail rotor blades according to environmental conditions measured by the aircraft sensors.

16. The rotorcraft of claim 1, further comprising:
a rotor system to generate aerodynamic lift, the rotor system producing torque in a first direction; and
an anti-torque system comprising the tail rotor blades and the tail rotor actuator, the anti-torque system producing torque in a second direction opposite the first direction.

17. A method of flying a rotorcraft, the method comprising:
sensing, by a flight control computer (FCC) of the rotorcraft, a current extension of a tail rotor actuator coupled to tail rotor blades of the rotorcraft;
determining, by the FCC, whether the current extension of the tail rotor actuator is within a margin of an extension limit of the tail rotor actuator;
indicating, by the FCC, a warning to a pilot of the rotorcraft in response to determining the current extension of the tail rotor actuator is within the margin of the extension limit of the tail rotor actuator; and
transmitting, by the FCC, a control signal to the tail rotor actuator, the tail rotor actuator being electrically coupled to the FCC such that the current extension of the tail rotor actuator varies according to the control signal from the FCC.

18. The method of claim 17, wherein the determining step is instituted in response to detecting a change in position of a pilot flight control of the rotorcraft.

19. The method of claim 17, wherein the determining step is instituted in response to the control signal being generated by the FCC to change the current extension of the tail rotor actuator.

20. The method of claim 17, wherein determining whether the current extension of the tail rotor actuator is within the margin of the extension limit of the tail rotor actuator comprises:
calculating a difference between the extension limit of the tail rotor actuator and the current extension of the tail rotor actuator; and
determining whether the difference is less than the margin.

21. The method of claim 17, wherein determining whether the current extension of the tail rotor actuator is within the margin of the extension limit of the tail rotor actuator comprises:
determining whether the current extension of the tail rotor actuator is greater than a predetermined value.

22. The method of claim 17, wherein transmitting the control signal to the tail rotor actuator comprises:
sensing, by the FCC, flight conditions of the rotorcraft;
calculating, by the FCC, a desired extension of the tail rotor actuator to achieve or maintain a desired flight attitude; and
transmitting, by the FCC, independently of a pilot command, the control signal to move the tail rotor actuator to the desired extension.

23. A method of flying a rotorcraft, the method comprising:
detecting input from a pilot flight control of the rotorcraft;
sensing a current extension of a tail rotor actuator coupled to tail rotor blades of the rotorcraft, the tail rotor actuator being electrically coupled to the pilot flight control such that the current extension of the tail rotor actuator varies according to the input from the pilot flight control;
determining whether actuating the tail rotor actuator according to the input from the pilot flight control would cause an updated extension of the tail rotor actuator to be within a margin of an extension limit of the tail rotor actuator; and
indicating a warning to a pilot of the rotorcraft in response to determining the updated extension of the tail rotor actuator will be within the margin of the extension limit of the tail rotor actuator.

* * * * *